April 24, 1956 J. DUNGLER Re. 24,144

GROUP OF NOZZLES FOR TREATING MATERIAL

Original Filed June 25, 1947 2 Sheets-Sheet 1

INVENTOR
JULIEN DUNGLER
BY Alex M. Strauss
AGT.

GROUP OF NOZZLES FOR TREATING MATERIAL

Original Filed June 25, 1947 2 Sheets-Sheet 2

INVENTOR
JULIEN DUNGLER
BY Leon M. Strauss Atty.

United States Patent Office

Re. 24,144
Reissued Apr. 24, 1956

24,144

GROUP OF NOZZLES FOR TREATING MATERIAL

Julien Dungler, Basel, Switzerland

Original No. 2,594,299, dated April 29, 1952, Serial No. 756,876, June 25, 1947. Application for reissue April 24, 1953, Serial No. 351,066. In France April 22, 1947

11 Claims. (Cl. 34—160)

Matter enclosed in heavy brackets [ ] appears in the original patent but forms no part of this reissue specification; matter printed in italics indicates the additions made by reissue.

The invention relates to apparatus used for various treatments of products by means of air, steam or other gaseous fluid, for example, apparatus for drying cloth, textiles in form of waste, yarn or hanks, paper and other cellulose materials, apparatus for conditioning textiles as by carbonization, steaming or deglossing, polymerization of coatings or impregnants and drying of foods or other products.

The invention concerns apparatus of the type above referred to comprising at least one group of spaced nozzle members through the orifices of which the active fluid (hot or cold air, saturated or superheated water steam, vapors, etc.) is forced under pressure to impinge upon the product to be treated, the intermediate spaces defined by the walls of adjacent or sucessive nozzle members forming exhaust passages or canals which, in the case of an apparatus for the treatment of continuously moving sheet material, extend transversely to the path of travel of the material and serve to remove the spent fluid with the aid of a partial vacuum (subatmospheric pressure) created therein.

Heretofore it has been the practice to provide considerable spacing between these orifices and the surface of the material to be treated, it having been believed necessary to rather distribute the discharged fluid over such surface. This practice, however, results in the formation of cushions of air or spent fluid (e. g. moisture-laden air) adjacent the surface of the material under treatment, which cushions markedly reduce the efficiency of the active fluid and of the apparatus.

The purpose of the invention is to provide maximum efficiency in apparatus of this type, i. e. to enable, by means of a group of blowing nozzle-members extending, opposite the treated product, over a given area, the highest output to be obtained while reducing to a minimum their consumption of treating fluid and of the power required for the circulation thereof.

It is, therefore, an object of this invention to provide means reducing to a minimum the consumption of treating fluid and the power required for the circulation of the fluid, and further means increasing the efficiency of the apparatus by avoiding the formation of air or spent-fluid cushions, as well as of eddy currents.

Still another object of the present invention is to provide means avoiding the formation of air or vapor cushions between the openings of the discharge nozzles and the material or product to be treated or dried, whereby a uniform treatment of the latter is obtained without disturbances usually occurring between the zones of fluid discharge and the zones of exhaust or evacuation of the spent treatment fluid.

It has further been found that there exists a significant relationship between the cross-section of the exhaust channels, measured transversely of the surface of treatment, and that of the discharge orifices, measured at each nozzle end wall, and that the ratio between these cross-sections ought to fall between predetermined limits in order to accomplish quick removal of the spent fluid and to render the aforementioned proportionate relationship of the parts of the passageways fully effective to result in the desired high degree of efficiency.

Accordingly, it is a further object of the present invention to provide means contributing to the establishment of a suitable ratio between the cross-sections referred to in order to improve the performance of the apparatus as compared with conventional arrangements.

As a result of repeated tests, I was able to prove that it is not sufficient to take into consideration solely, as has been done heretofore, the cross-section to be given to the outlet or orifices of the nozzle-members for projecting the active fluid [on to] *onto* the material to be treated, but that two other factors are important for obtaining maximum efficiency, viz. on the one hand the distance between the plane of the material to be treated and that of said orifices, which has to be calculated in accordance with the discharge end or area of each of said orifices, and on the other hand the vertical cross-section of the exhaust pasasge or intermediate canal provided between two successive nozzle-members, which should be so calculated as to ensure quick removal of the fluid after it has acted on the treated product.

The improvements according to the invention precisely relate to the rational calculation of the two essential factors hereinbefore referred to; they are characterized in that:

1. On the one hand, the distance between the plane of the product to be treated and the end faces of the orifices for the active fluid is so chosen as to be smaller than, or at the most equal to, ten times the ratio between the sum of the cross-sections of the respective end faces of the [orifies] *orifices* of one and the same nozzle-member and the useful length of said nozzle-member, i. e. the length of the portion of the nozzle-member in which the orifices are provided[, and on]. *On* the other hand, the sum of the vertical cross-sections of all the outlet or exhaust passages or canals located between the blowing nozzle-members of the same group is so chosen as to be at least equal to twice the sum of the cross-sections of the end faces of the orifices of all of said nozzle-members.

2. Preferably, the distance between the plane of the path of travel of the material to be treated and that of the end faces of the orifices is chosen equal to double the ratio between the sum of the cross-sections of the end faces of the blowing orifices of one and the same nozzle-member and the useful length of said nozzle-member.

3. Preferably, the ratio between the sum of the vertical cross-sections of all the channels or outlet passages and the sum of the cross-sections of the end faces of the orifices of all the nozzle-members is chosen greater than, or at least equal to, five.

The invention will be more clearly understood by means of the ensuing description of an embodiment which is given by way of example and is diagrammatically illustrated in the accompanying drawings, in which.

Figure 1:
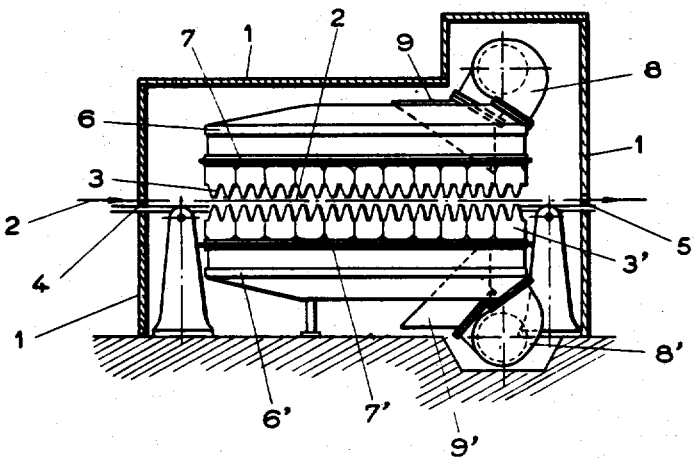
Fig. 1 is a schematic view, partly in front elevation and partly in section, of a cloth drying machine which is provided with an upper group and with a lower group of blowing nozzle-members defining the path in which the cloth moves.
Figure 2:
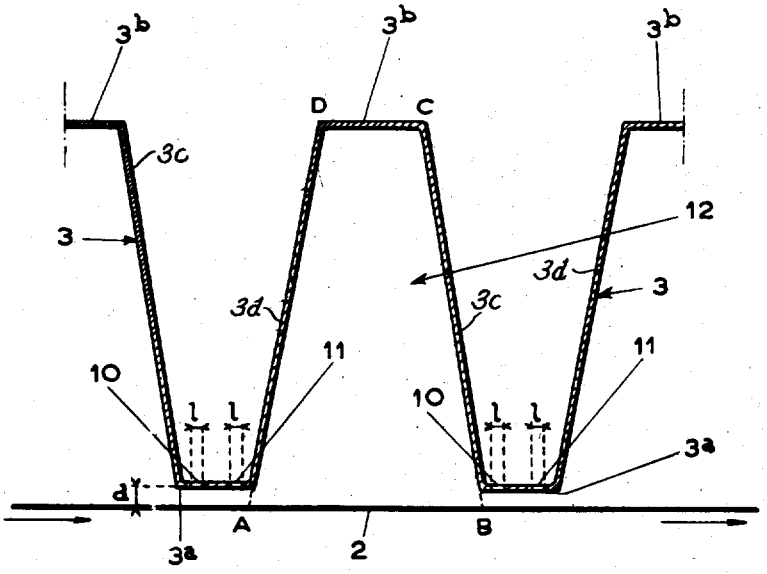
Fig. 2 shows, on a larger scale, a transverse vertical section of two nozzle-members of the upper group with an intermediate canal or outlet passage.
Figure 3:
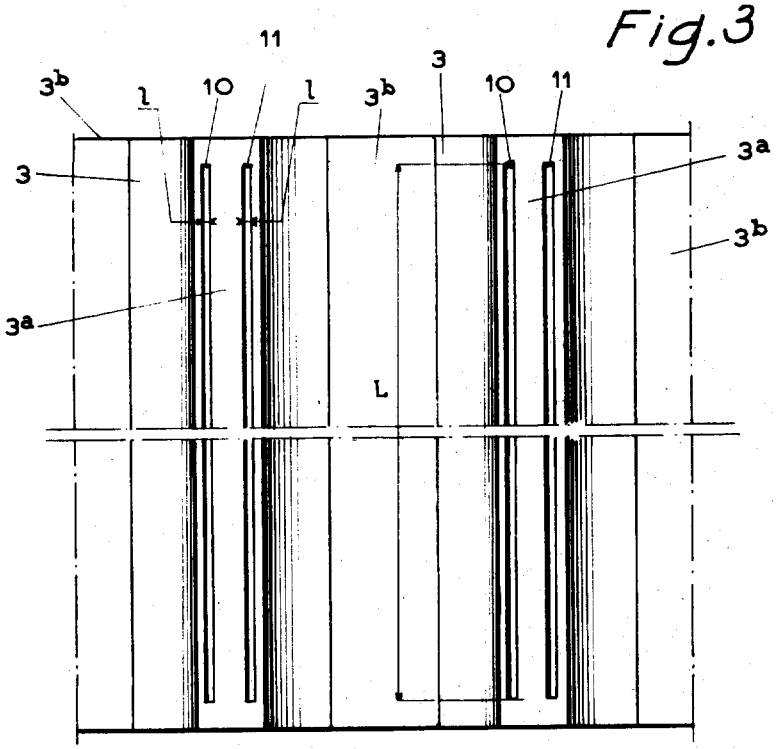
Fig. 3 is a bottom plan view of the blowing orifices of said nozzle-members and intermediate canals.

In these drawings, numeral 1 designates the walls of the insulating chamber containing the drier which comprises two groups of blowing nozzle-members 3, 3' working independently of one another, one being located above the plane of the path of travel of the product or material 2 to be treated, cloth for example, and the other therebelow.

The blowing nozzle-members or nozzle means 3 and 3' of the two groups, which are located inside the chamber 1 and extend transversely with respect to the direction of travel of the cloth 2, are placed opposite one another and a short distance apart, so as to provide between them a sufficient passage for the cloth 2 which is introduced into the chamber at 4, leaves same at 5 and moves continuously at completely open width, the orifices or passageways of said nozzle-members, which extend over the entire width of the cloth 2, opening immediately adjacent said cloth and thus act directly in angular direction on same.

6 and 6' are casings inside which are placed heaters 7—7' which supply their respective nozzle-members 3 and 3' with hot compressed air or other fluid delivered by fans or blowers 8 and 8' provided with suction funnels 9 and 9' opening inside the chamber 1.

In the ensuing description, reference will be made only to the upper nozzle-members 3, in order to dispense with the description of the lower nozzle-members, it being of course understood that the improvements which are about to be described also apply to the lower nozzle-members 3'. It is obvious that the drier may only be provided with a single group, or battery, of blowing nozzle-members, for example, only the upper battery.

Each of the nozzle-members 3 is provided, at its lower end, with orifices which, in the example illustrated, comprise two parallel longitudinal slots or passageways 10 and 11 provided in the end wall or extremity 3a of the nozzle-member. The hot fluid discharged through the slots 10 and 11 by the forcing action of the fan 8, steams out, after having become charged with moisture in contact with the cloth 2, through the horizontal outlet passage or channel means 12 formed between walls 3c, 3d of the adjacent nozzle means 3, which walls are joined together at the extremity 3b, said channel means 12 having a partial vacuum created therein by the suction of the same fan 8.

Let the following designations be assumed:

S=total vertical area between nozzle members
$S_1$=sum of nozzle slot areas of one nozzle
$S_2$=useful vertical area of an obstructed outlet between two nozzles
$n_1$=number of nozzle members
$n_2$=number of outlets between nozzle members
L—length of a nozzle slot
l or $l_1$=width of nozzle slots
d=distance between nozzle end face and work Then, according to the invention, the distance d between the plane of the cloth 2 and that of the end wall 3a of the nozzle member 3 or 3' in which are provided the slots 10 and 11 is so chosen [as to be smaller than, or at the most equal to,] *that the distance of the blowing orifices of the blowing nozzles from the surface of the cloth extends approximately from a position of the blowing orifices directly adjacent the surface of the cloth to a position from the latter up to but always less than* ten times the ratio between the sum of the cross-sections of the [respective] end faces of [the slots or passageways] *said blowing orifices* of one and the same nozzle-member and the useful or effective length (length of the slots *or blowing orifices* in the nozzle) L of said nozzle-member.

$$d = \text{or} < 10.\frac{S_1}{L}$$

Preferably d is chosen approximately equal to double this ratio, i. e.

$$d = \frac{2S_1}{L}$$

In the particular case in which the orifices are formed by two rectangular slots of widths l and l' respectively, the first formula gives:

$$d = \text{or} < 10\frac{(l+l')L}{L} \text{ or } d = \text{or} < 10(l+l')$$

Preferably this distance is chosen equal to double the said ratio, i. e.

$$d = 2\frac{(l+l')L}{L} = 2(l+l')$$

If it is assumed that l=l', the formula gives in this particular case:

$$d = 4l$$

As regards the vertical cross-section S of the horizontal outlet passage or channel 12 which, in the example illustrated, is of the shape of a trapezium ABCD, it is so chosen that the sum of the vertical cross-sections of all such passages positioned between blowing nozzle-members of the same group (i. e. $n_2S$ asuming that there are $n_2$ identical passages) is at least equal to double of the sum of the cross-sections of the end faces of the orifices of all the nozzle-members (i. e. $n_1S_1$ assuming that there are $n_1$ nozzle members perforated in the same manner), i. e.:

$$n_2S = \text{or} > 2n_1S_1$$

If arrangements are made such that $n_2=n_1$ (by providing a half outlet passage at the beginning and at the end of the group of nozzle-members), the condition becomes:

$$S = \text{or} > 2S_1$$

In the example illustrated, in which each nozzle-member is provided with orifices forming two rectangular slits of width l and of length L, the condition becomes:

$$S = \text{or} > 4L.l$$

Preferably the ratio considered is chosen at least equal to 5, which gives for the general formula:

$$n_2S = \text{or} > 5n_1S_1$$

If $n_2=n_1$:

$$S = \text{or} > 5S_1$$

and for the example illustrated:

$$S = \text{or} > 10L.l$$

Figure 4:
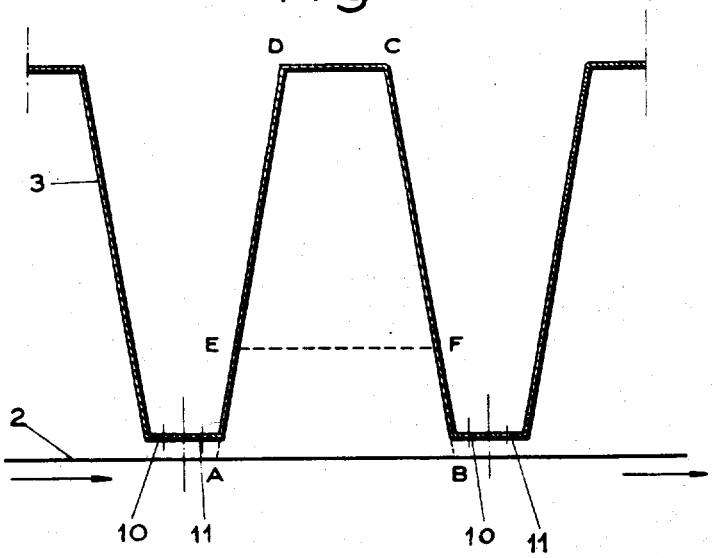
Fig. 4 is a view similar to that of Fig. 2, relating to a particular structure.

In certain cases, the end of the outlet passages is partially closed by the conveyor means for the product *under treatment*. Thus, for example, for a drying tenter, the lower part ABFE (Fig. 4) of the passage, as regards the upper nozzle-members, is obstructed by the passing of the clips which hold the cloth and of the translation chain on which said clips are mounted. For the lower nozzle-members, the upper part is obstructed by the guide rail for the clips.

In such a case, if $S_2$ designates the completely free area of the useful vertical cross-section CDEF, and in view of the fact that the cross-section ABFE still participates to a certain extent in exhausting the fluid, the following condition should be made to apply:

$$n_2S_2 = \text{or} > 1.5n_1S_1$$

i. e. if $n_2=n_1$ $$S_2 = \text{or} > 1.5S_1$$

and preferably:

$$S_2 = \text{or} > 4S_1$$

i. e. for the case of nozzle-members with rectangular slots each of the same length:

$$S_2 = \text{or} > 4L.l$$

and preferably:

$$S_2 = \text{or} > 8L.l$$

It can thus be seen that there has been provided an apparatus for treating in particular lengthy materials by means of compressed gaseous fluid, which is characterized by the provision of nozzle means 3, 3' and channel means 12, each nozzle means 3, 3' being defined by two lateral walls 3c, 3d terminating in an extremity 3a positioned adjacent the path of travel of said material 2, one of said lateral walls 3d of one of said nozzle means 3 and an adjacent lateral wall 3c of another nozzle means 3 forming said channel means 12, each channel means 12 including a closed extremity 3b, each closed extremity 3b of each channel means being positioned in staggered relation to the respective extremity 3a of said nozzle means and remote from said path of travel of said material, said nozzle means 3, 3' being shaped to conduct said fluid angularly to said path of travel of said material thereagainst, said channel means 12 extending in a plane substantially perpendicular to said nozzle means 3, 3' and guiding said fluid for retreat in a plane substantially parallel to the path of travel of said material, each extremity 3a of each nozzle means being provided with at least one passageway 10 or 11 through which said fluid is conducted under pressure to impinge upon said material 2, said passageway 10 or 11 having a length L and a width l and being positioned a distance d from the material under treatment, whereby d is equal to 2×l or less than 10×l, the cross-section of said channel means being (S) and equal to 2L×l and less than 10L×l.

It is of course understood that the invention is in no way limited to a particular shape of blowing nozzle-member and that it applies on the contrary whatever the cross-sectional shape, the nature, the manner of construction and of mounting, etc., of the blowing nozzle-members and of the intermediate passages formed thereby.

Having thus described the invention, what I claim as new and desire to be secured by Letters Patent, is:

1. An apparatus for treating fibrous products by means of air, steam, and similar gaseous fluid comprising at least one group of equally spaced nozzle-members, each nozzle-member being provided with two converging walls and with blowing orifices located opposite the product to be treated, the intermediate spaces defined by walls of each two successive nozzle-members and connections thereof forming passages, means forcing said gaseous fluid through said orifices, and means for creating a vacuum in said passages whereby said fluid is exhausted after it has been discharged from said orifices and acted on the product to be treated, the distance between the plane of said product to be treated and that of said blowing orifices is not less than two times nor larger than ten times the ratio between the sum of the cross-sections of the end faces of said blowing orifices of one and the same nozzle-member and the effective length of said blowing orifices, the sum of the vertical cross-sections of all said passages located between said blowing nozzle-members of the same group is at least equal to twice but less than ten times the sum of the area of the orifices at the end faces of the nozzle-members opposite the product to be treated.

2. An apparatus for treating fibrous products by means of air, steam, and similar gaseous fluid comprising at least one group of equally spaced nozzle-members provided with blowing orifices located opposite the product to be treated, the intermediate spaces defined by the walls of the successive nozzle-members and connections thereof forming passages, means for forcing said gaseous fluid through said orifices, and means for creating a vacuum in said passages whereby said fluid is exhausted after it has acted on the product to be treated, the distance between the plane of said product and that of the blowing orifices being approximately equal to double the ratio between the sum of the cross-sections of the end faces of the blowing orifices of one and the same nozzle-member and the effective length of said blowing orifices, the sum of the vertical cross-sections of all said passages located between the blowing nozzle-members of the same group is at least equal to twice but less than ten times the sum of the areas of the orifices at the end faces of the nozzle-members opposite the product to be treated.

3. An apparatus for treating fibrous products by means of air, steam, and similar gaseous fluid comprising at least one group of spaced-apart nozzle-members provided with blowing orifices located opposite the product to be treated, the intermediate spaces defined by the walls of successive nozzle-members and connections thereof forming passages, means for forcing said gaseous fluid through said orifices, and means for creating a vacuum in said passages whereby said fluid is exhausted after it has acted on the product to be treated, wherein the distance between the plane of said product and of said blowing orifices is not less than two times nor larger than ten times the ratio between the sum of the cross-sections of the end faces of said blowing orifices of one and the same nozzle-member and the length of the portion of said nozzle-member over which said blowing orifices extend, the ratio between the sum of the vertical cross-sections of all said passages located between the blowing nozzle-members of the same group and the sum of the areas of the orifices at the end faces of the nozzle-members opposite the product to be treated is at least equal to five, but less than ten.

4. An apparatus for treating lengthy fibrous products by means of air, steam, and similar gaseous fluid comprising at least one group of spaced-apart nozzle-members each provided with blowing orifices located opposite the product to be treated, the intermediate spaces defined by the walls of successive nozzle-members and connections thereof forming passages, means for forcing said gaseous fluid through said orifices, and means for creating a vacuum in said passages whereby said fluid is deviated and exhausted after it has acted on the product to be treated, the distance between the plane of said product and of said blowing orifices being about equal to double the ratio between the sum of the cross-sections of the end faces of said blowing orifices of one and the same nozzle-member and the length of the portion of said nozzle-member over which said blowing orifices extend, the ratio between the sum of the vertical cross-sections of all said passages located between the blowing nozzle-members of the same group and the sum of the areas of the orifices at the end faces of the nozzle-members opposite the product to be treated is at least equal to five, but less than ten.

5. An apparatus for treating sheet material and the like by means of a gaseous fluid; comprising nozzle means, each of said nozzle means being provided with an end wall having at least one elongated slot forming an orifice through which said fluid is supplied under pressure to impinge upon said material in substantially perpendicular direction to the path of travel of said material, and other walls forming a channel through which said fluid is conducted when retreating from said material, said other walls being positioned adjacent the end wall of one of said nozzle means and an adjacent end wall of another of said nozzle means, both said other walls extending in angular direction to said end walls of said nozzle means and converging toward each other, each slot having a length L and a width l and being positioned a distance d from the material under treatment, whereby d is equal to 2×l or less than [than] 10×l, the vertical cross-section of said channel means being an area S which area is no less than 2L×l or not larger than 10L×l.

6. An apparatus according to claim 5, wherein said other walls converge toward each other and are joined together at a location remote from said path of travel of said material, whereby the space between the end walls adjacent the path of travel of the material is larger than the distance at the connection of said other walls, to facilitate accommodation of conveyor means for said material within said space.

7. An apparatus according to claim 5, wherein said channel extends in horizontal direction, whereas said nozzle means are shaped to permit supply of said fluid in vertical direction with respect to the material to be treated.

8. An apparatus for treating sheet material and the like by means of a gaseous fluid, comprising a plurality of nozzle means, each of said nozzle means being provided with an end wall facing the material to be treated and having two adjacent, elongated slots of substantially equal width through which said fluid is supplied under pressure to impinge upon said material in a direction substantially perpendicular to the path of travel of said material, and channel means intermediate two adjacent nozzle means and including walls defining said adjacent nozzle means, said walls forming a space between adjacent end walls of said nozzle means and converging toward each other so as to terminate in a wall transverse to the path of travel of said material and arranged in staggered relation to the end walls of said adjacent nozzle means, whereby said fluid after the same retreats from said material is conducted through said channel means at an angle with respect to said fluid supplied through said slots and parallel to the path of travel of said material, each slot having a length L and a width l and being positioned a distance d from the material under treatment, whereby d is equal to 2×l or less than 10×l, the cross-section of said channel means being an area S, which area is no less than 2L×l and no larger than 10L×l.

9. An apparatus for treating sheet material by means of gaseous fluid; comprising nozzle means, and channel means, each nozzle means being defined by two lateral walls terminating in an end wall positioned adjacent the plane in which said material extends, one of said lateral walls of one of said nozzle means and an adjacent lateral wall of another nozzle means forming said channel means, each channel means including an imperforate transverse wall and opposed open ends, each transverse wall of each channel means being positioned in staggered relation to the respective end wall of said nozzle means and remote from said plane of said material, said nozzle means being shaped to conduct said fluid in a plane substantially perpendicular to said plane of said material and thereagainst, each end wall of each nozzle means being provided with at least one passageway through which said fluid is conducted under pressure to impinge upon said material, said passageway having a length L and a width l and being positioned a distance d from the material under treatment, whereby d is equal [is] *to* 2×l or less than 10×l, the vertical cross-section of said channel means being an area S, said area being no less than 2L×l or not larger than 10L×l.

*10. An apparatus for treating a fibrous product by means of air, steam, and similar gaseous fluid comprising at least one group of equally spaced nozzle members, each nozzle member being provided with two converging walls and with blowing orifices arranged for location opposite the product to be treated, the intermediate spaces defined by walls of each two successive nozzle members and connections thereof forming passages, means for forcing said gaseous fluid through said orifices, and means for reducing the pressure in said passages whereby said fluid is exhausted after it has been discharged from said orifices and has acted on the product to be treated, the distance of the end faces of the blowing orifices of the blowing nozzle members from the surface of the product varying approximately from a minimum value greater than zero to a maximum value of not more than ten times the ratio between the sum of the cross-sections of the end faces of said blowing orifices of one and the same nozzle member and the effective length of said blowing orifices, the sum of the vertical cross-sections of all passages located between said blowing nozzle members of the same group being at least equal to twice but less than ten times the sum of the areas of the orifices at the end faces of the nozzle members opposite the product to be treated.*

*11. An apparatus for treating penetrable sheet material by means of air, steam, and similar gaseous fluid comprising at least one group of equally spaced nozzle members, each nozzle member being provided with two converging walls and with blowing orifices adapted for location opposite the surface of said sheet material to be treated, the intermediate spaces defined by walls of each two successive nozzle members and connections thereof forming passages, means for forcing said gaseous fluid through said orifices, and means for reducing the pressure in said passages whereby said fluid is exhausted after it has been discharged from said orifices and has acted on said sheet material to be treated, the distance between the upper surface of the sheet material to be treated and the end faces of the orifices for the fluid varying from a minimum value greater than zero to a maximum value of two times the ratio between the sum of the cross-sections of the respective end faces of the orifices of one and the same nozzle member and the useful length of said nozzle member, the sum of the vertical cross-sections of all said passages located between said blowing nozzle members of the same group being at least equal to twice but less than ten times the sum of the areas of the orifices at the end faces of the nozzle members opposite said sheet material.*

References Cited in the file of this patent or the original patent

UNITED STATES PATENTS

| | | |
|---|---|---|
| 1,933,960 | Brabaek | Nov. 7, 1933 |
| 2,008,230 | Spooner | July 16, 1935 |

FOREIGN PATENTS

| | | |
|---|---|---|
| 856,315 | France | Mar. 18, 1940 |